July 13, 1954  H. E. RUEHLEMANN ET AL  2,683,791
WIRE ARC WELDING METHOD AND DEVICE
Filed Aug. 27, 1951  4 Sheets-Sheet 1

*INVENTORS*
H. E. RUEHLEMANN
BY W. A. MENZEL

*ATTYS.*

Patented July 13, 1954

2,683,791

UNITED STATES PATENT OFFICE 2,683,791

WIRE ARC WELDING METHOD AND DEVICE

Herbert E. Ruehlemann and Wolfgang A. Menzel, Silver Spring, Md.

Application August 27, 1951, Serial No. 243,906

20 Claims. (Cl. 219—8)

(Granted under Title 35, U. S. Code (1952), sec. 266)

This invention relates to a portable arc welding device in which the device is brought into contact with the material to be welded by an operator and more specifically to an arc welding device in which the movable welding element is actuated by an alternating current only during the time that the welding operation is in progress.

In devices of this character heretofore devised, such for example, as the device disclosed and claimed in the German Patent No. 662,973, wherein the arc extinguishes when the voltage goes through zero and the movable welding element is maintained in continuous reciprocal operation at constant frequency and amplitude regardless of whether a welding arc has been struck. In certain other of these devices heretofore in use in Germany, the control of the welding current is obtained by a rheostat in series with the solenoid of the welding device or by a tapped secondary transformer, as the case may be. Such devices have not been altogether satisfactory under the conditions of service for the reason that reciprocal movement of one of the conductors synchronously with movement of the plunger caused frequent circuit interruptions, the initial spring bias on the plunger progressively decreased with use and considerable changes in the circuit constants were necessary when welding different kinds of material. The well known arc welding process which has been in use for a considerable period of time is not usable for welding small wires because it is difficult to obtain reliable connections.

These disadvantages have been overcome in the device of the instant invention by the arrangements of circuits and parts comprising the structure of the device as will hereinafter appear in greater detail.

The use of a portable arc welding device as in the instant invention has advantages over the conventional method of soldering especially in the assembly of electronic and electrical equipments where numerous connections between wires and wires to terminals must be made by permitting a considerable reduction in time and heat required for each operation as well as the elimination of the use of flux material such as tin to reduce surface oxidization and lower contact resistance between connections due to a more homogenous fusion of the materials of the joint.

It is a primary object of the present invention, therefore, to provide a new and improved portable welding device having a spring biased magnetically reciprocated electrode operated from an alternating current source in such manner that current flows and the device operates only on contact with the material to be welded and the current stops flowing and the device ceases operation when the weld is completed.

It is a further object of the invention to provide a welding device using a transformer having a high leakage reactance to provide a phase shift whereby the arc current is sustained for a period of time after the voltage of the source has decreased to zero magnitude.

It is also an object of the present invention to provide a welding device to operate on alternating current wherein a stable arc is provided during successive phases of a welding operation so that a high current flows in the arc at the time the greatest amount of material is to be melted.

It is a further object of the invention to provide means to compensate for variations in the initial tension of the movable element biasing spring caused by erosion of the carbon element affixed to one end thereof whereby the welding conditions are unchanged as the result of erosion of the movable welding element when employed in welding the same size and kind of material.

It is a further object to provide resilient adjusting means and control therefor to move the welding electrode into contact with the material to be welded whenever the welding process is initiated.

It is a further object to eliminate the bending movement of all electrical leads during a welding operation and the frictional retardation effects caused by such bending on the operation of the plunger during a welding operation.

It is a further object to provide in a portable welding device a plurality of detachable nose or shield elements of different size, structure and material which are employed selectively in accordance with the particular condition of welding.

It is a further object of the present invention to provide a portable welding device which is simple to operate and can be used to join wires of small diameter or wires to terminals at a considerable saving of time over the conventional soldering technique.

Other objects and many of the attendant advantages of this invention will be readily appreciated as the same becomes better understood by reference to the following detailed description when considered in connection with the accompanying drawings wherein:

Figure 1:
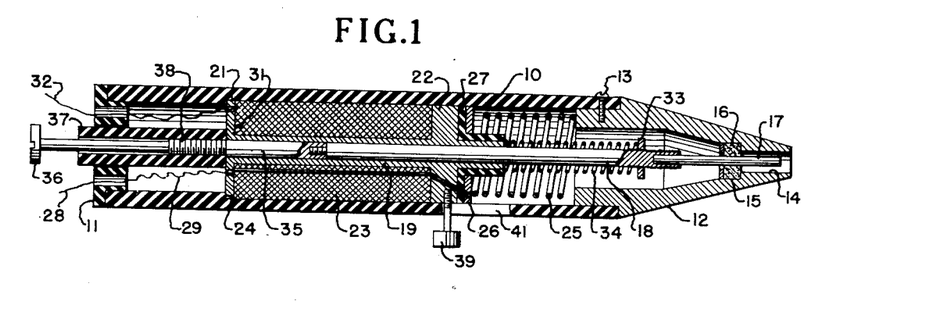
Fig. 1 is a sectional view of the device in accordance with a preferred embodiment thereof.

Referring now particularly to Fig. 1 there is shown thereon the welding device in accordance with a preferred form of the invention comprising a cylindrical casing 10 preferably composed of insulating material and provided with a bearing cap 11 at one end thereof and a detachable nose or shield 12 secured to the other end thereof as by the screw 13. The nose or shield 12 is composed of material such as brass and provided with a bore 14 therein in face adjacency with a second bore 15 of somewhat greater diameter within which is disposed a washer 20 in abutting relation with a bearing 16 preferably composed of ceramic material and having a bore therein adapted to slidably receive a carbon welding rod 17. The rod 17 is secured to a magnetic plunger 18 slidably disposed within a sleeve 19 having flanged ends 21 and 22 between which is disposed the solenoid coil 23. The ends 21 and 22 are slidably arranged within the casing 10 and normally urged against a shoulder 24 by a spring 25. One end of the spring 25 engages the inner end of nose or shield 12 and the other end is in abutting engagement with a metallic washer 26 insulated from the sleeve 19 in any suitable manner as by the member 27. The washer 26 is connected to a conductor 28 disposed within aligned apertures formed within the coil and end caps 21 and 22 respectively from whence the conductor 28, which may be in the form of a flexible wire or a strip of metal, continues through a suitable aperture 30 within the bearing cap 11 to a source of alternating current received from the secondary of a transformer, sufficient slack at 29 being provided to allow endwise movement of the coil assembly.

While the device has been described as having a solenoid slidably mounted relative to the casing 10, it is also possible that the device may be arranged so that the solenoid 23 is rigidly secured to the casing 10 and the nose or shield 12 is spring biased and movable relative to the casing 10.

One end of the coil winding is connected to the sleeve 19 as at 31 and the other end of the coil is connected to conductor 32, sufficient slack being provided in the conductor to permit endwise movement of the coil. The conductor 32 extends through a second aperture 40 in the bearing cap 11.

The plunger 18 is provided with a shoulder 33 in abutting engagement with a spring 34 whereby the plunger is urged in the direction of the nose or shield of the device. Secured to the inner end of the plunger 18 is a nonmagnetic rod 35 provided with a knurl or slot 36 in one end thereof for adjusting the position of an insulated sleeve 37 threadably secured thereto as at 38 whereby the inner end of the sleeve 37 is employed as a stop against end 21 when the device is in an unoperated condition. The tension of spring 34 is adjusted to any desired value by the sleeve 37 and rod 35 aforesaid. There is also provided an operating pin 39 threaded within the end cap 22 and adapted for longitudinal movement within a slot 41 formed within the casing 10, which alternatively could be a series of notches.

The operation of the device will now be described. Let it be assumed, by way of example, that the conductors 28 and 32 are connected to the secondary of transformer 42, Fig. 3, and that the primary of the transformer is continuously energized by an alternating current. The nose or shield 12 of the device is brought into engagement with the material to be welded and the pin 39 is moved within the slot 41 until the rod 17 engages the material, the coil assembly moving axially within the casing 10 until the rod 17 has engaged the material. During such movement the spring 25 is compressed by the forward movement of pin 39 which is held in position until a welding operation is completed.

Figure 3:
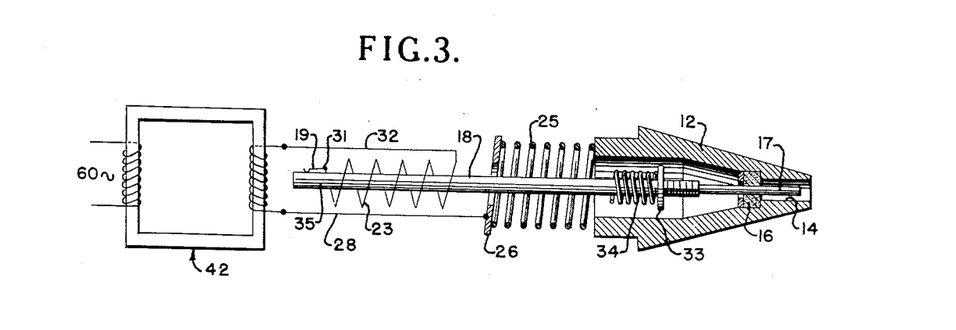
Fig. 3 is a circuit diagram suitable for use with the devices of Figs. 1, 2, 4, 5 and 6.

Upon contact of the rod 17 with the material to be welded a circuit is closed from the secondary of the transformer by way of conductor 32, coil 23 and thence by way of sleeve 19, plunger 18 and rod 17 to the material to be welded from whence the circuit is continued by way of nose 12, spring 25, washer 26 and conductor 28 to the other end of the secondary of the transformer winding thereby energizing the coil and causing the plunger 18 to be drawn into the coil against the pressure of the spring 34, Fig. 1. As the rod 17 thus moves away from the work an arc is set up therebetween. When the plunger has been retracted sufficiently or the alternating voltage has diminished sufficiently, as the case may be, to extinguish the arc, the coil is deenergized and the rod 17 is again moved into contact with the material by spring 34. This cycle of operations is continued until sufficient material has been welded to prevent reestablishment of the circuit to the coil as the rod 17 reaches the limit of endwise movement and the sleeve 37 engages the end cap 21. When this occurs the pin 39 is allowed to move to the initial position shown on the drawing.

Figure 2:
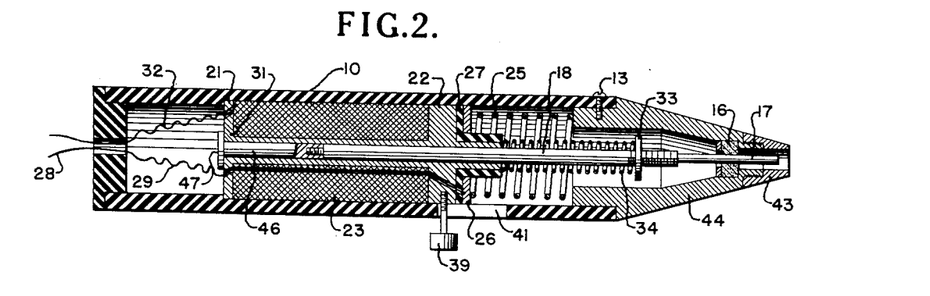
Fig. 2 is a view in section of an alternative form of the device.

Referring now to Fig. 2 on which is shown an alternative form of the device, the nose is composed of a detachable tip section 43 secured in any suitable manner to the main body of the nose or shield 44. The advantage of this nose or shield arrangement resides in the provision of small removable tip sections which may be replaced as desired when the tip has been sufficiently eroded by welding action or when a different kind of material is to be welded or the material is located in cramped quarters. The stop 33 for the spring 34 is adjustably secured to the plunger 18 in any suitable manner as by threading the parts together whereby the initial tension of the spring 34 may be adjusted. In this arrangement the rod 46 secured to the plunger 18 is provided with a head 47 for limiting the forward movement of the plunger 18 with respect to the coil 23.

In each of the foregoing arrangements the initial tension of spring 34 is unaffected by erosion of the carbon rod 17, it being merely necessary to move the pin 39 forwardly until the carbon rod contacts the material to initiate a welding cycle.

By providing a transformer in which the primary and secondary windings are respectively disposed on opposite legs of the transformer core as shown in the drawing and which has high leakage fluxes, the flux set up by the secondary current opposes the flux set up by the primary current causing a secondary voltage drop and a phase shift with respect to the primary voltage which tends to stabilize the arc. Whereas the transformer illustrated in Fig. 3 is of the window type, other types may, if desired, be employed such, for example, as a closed core transformer having both windings on the center leg, it being merely necessary to provide a closed core transformer in which the windings do not overlap.

An adjustable ferro-magnetic flux leakage path in addition to the path through the transformer core may be provided in combination with the transformer, if desired, to permit varying the arc current for different kinds and sizes of material. For example, a strip of soft iron may be hingedly attached to a portion of the transformer core and made adjustable so that the flux path in air around the core may be varied to obtain the proper voltage drop on the secondary side of the transformer necessary for a stable arc. No appreciable flux in the additional path will be present in the absence of secondary current but any time a secondary current flows, the flux produced by this current opposed the flux produced by the primary coil and flux leaves the iron core and enters the surrounding air. By providing a ferro-magnetic path in the air path surrounding the core, the opposing flux lines will pass through the additional ferro-magnetic path and therefor more flux lines will leave the transformer core resulting in an increased secondary voltage drop which may be controlled by adjusting the distance between the additional soft iron strip and the transformer core. The above described manner of adjusting the transformer secondary voltage drop by providing a variable flux path of higher permeability than air, external of the transformer core, is old and well known and is not considered a part of the present invention.

Fig. 3 shows the circuit diagram of the device. The solenoid 23 is in series with the arc, which is struck only during each cycle when the welding element contacts the work and when the current and voltage of the source are of the proper magnitude. During each cycle the arc current and arc voltage are in phase, the solenoid voltage and the transformer voltage drop due to the transformer inductive reactance are out of phase by about 40° with the transformer secondary voltage. This phase shift permits the arc to be sustained for a short period after the source voltage has passed through zero thereby providing a more stable arc. In a welding cycle, as the source current increases on the positive half of the cycle, the voltage drop across the transformer secondary increases due to the high inductive reactance of the transformer resulting in a decrease in arc voltage. As the source current increases, the solenoid 23 increases the distance between the carbon rod 17 and the weld, resulting in a longer arc with consequent increase in voltage drop. When the source voltage decreases, the arc current decreases resulting in a lower voltage drop across the transformer secondary and solenoid and in a consequent relatively higher voltage across the arc since the arc has a negative coefficient of resistance. The decrease in arc current results in a reduced magnetic attraction on the plunger 18 and a shortened distance between the carbon rod 17 and the material to be welded. The circuit constants and arrangement thereof, in which the above conditions of current and voltage exist provide an arc which burns for a longer time during each cycle. In a typical application of the device in welding a copper, iron connection arc current flowed during 75.5% at the initial part of the welding operation and as the weld progressed current flowed for 81% of a complete cycle. The variation in time of current flow in the arc is due to the fact that during the first few cycles of the welding process copper was being melted and at about the 17th cycle when current flowed for 81% of the cycle, iron was being melted which required a longer period of time to melt.

The circuit arrangement additionally permits the carbon rod to vibrate with line frequency during each cycle when current is flowing in the arc. When the magnetic forces of the coil are high enough to overcome the force of spring 34, the carbon rod starts to move away from the material and the amplitude of movement of the carbon rod 17 as the welding operation is in process and its position is a function of the arc current.

A period of about 40 to 60 cycles is required after about 4 to 6 cycles of welding to obtain the proper distance for a stable arc on the positive or negative half cycle. This operation is automatic because the forces to move the carbon rod are a function of the arc current. For example, when the material of the weld melts away from the end of the nose or shield 12, the current decreases because of the increased distance and the current in the solenoid decreases so that reciprocation of the carbon rod takes place in a smaller distance. In this way a reliable arc is sustained for a period just sufficient to melt away the material of the joint being welded.

In the example previously given of a copper-iron connection, the arc may conduct for a few cycles to one material (copper) which when it melts away from the reciprocating carbon rod will increase the distance and the arc may then conduct for a few cycles to the other material (iron). Depending on the current which flows in the arc, the vibration of the carbon rod occurs in the distance and with an amplitude such that an optimum stable arc is obtained. Thus at any time during the welding process the solenoid automatically adjusts the carbon rod so that a stable arc is obtained under all changing conditions during the time the welding process takes place. This is extremely advantageous in view of the difficulty of obtaining a stable arc on alternating current since for each kind and size of material to be welded only one length of arc can be most efficient. Small diameter wires during a few cycles and larger diameter wires during a greater number of cycles are welded in the same way and with the same accuracy.

In one model of the device an arc current of about 12 amperes was used and 55 volts at the transformer secondary terminals or 660 volt amperes available for the welding process.

Figures 4, 7, 8:
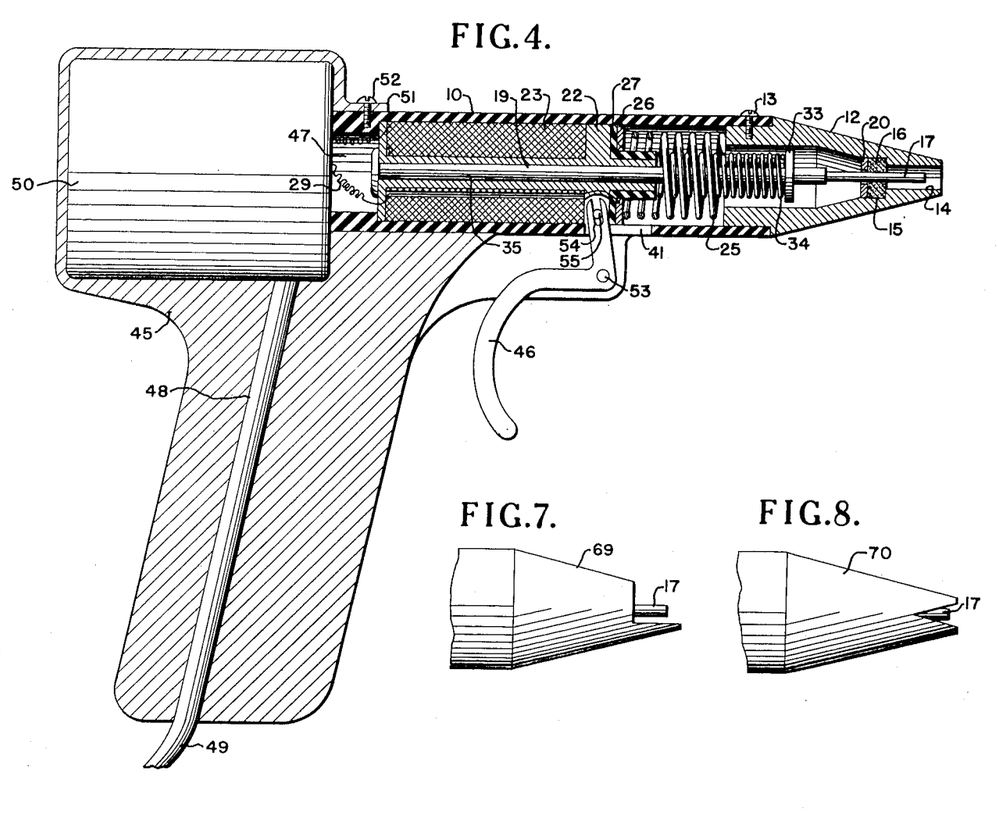
Fig. 4 is a view in section of a modified form of the device showing a trigger arrangement for advancing the electrode.
Fig. 7 is a sectional view of a modified form of a partially open nose or shield structure.
Fig. 8 is a sectional view of another form of a partially open nose or shield structure.

Fig. 4 shows a modification of the device, similar in structure and operation to Fig. 2 with the addition of a pistol grip handle 45 and a trigger 46 for advancing the electrode, in place of the movable pin 39. The pistol grip has a hollow portion 47 to accommodate a transformer 50 and a passage 48 for conductor 49 which connects transformer 50 to a source of alternating current. The pistol grip, which may be made of any suitable material, and ventilated by slots or other means has a flanged portion 51 adapted to be attached to the tubular portion of the insulating casing 10 by means of a bolt or other fastening means 52. The trigger 46 is pivoted at 53 and is provided with a slot 54 to permit sliding movement with relation to the bolt 55 attaching the slotted end of trigger 46 to the flanged end 22 of sleeve 19. Squeezing the trigger advances the electrode in the same manner as moving the pin 39 in slot 41. The modification shown in Fig. 4 may be provided with an interchangeable tip as shown at 43 or any of the variations of the tip structure shown in Figs. 5, 6, 7 or 8 and operates in the same manner as described in connection with Fig. 1 and Fig. 2.

Figures 5, 6:
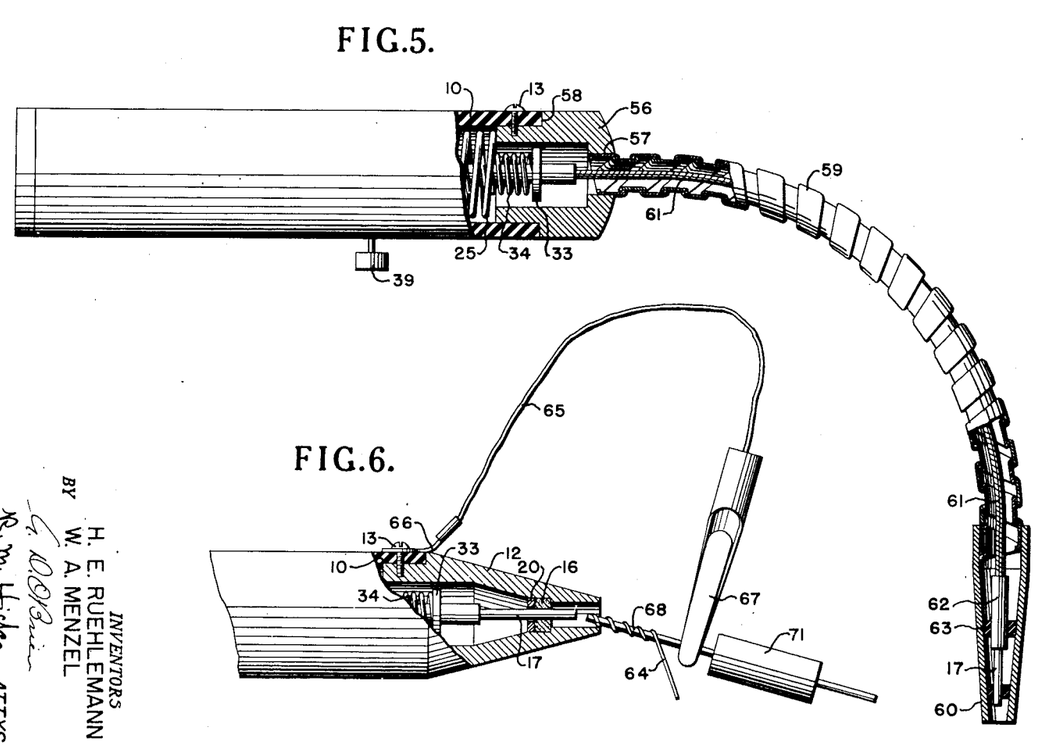
Fig. 5 is a sectional view of another form of the device having a flexible electrode holder.
Fig. 6 is a view partly in section of a modified nose structure for joining insulated and non-insulated conductors.

In order to permit use of the device in locations where nose or shield structures such as shown in Fig. 2 would be too large and inconvenient, the structure of Fig. 2 may be modified as shown in Fig. 5 wherein the nose of shield 44 is removed and replaced by the nose piece 56 which has a central aperture 57 and shoulder 58 for abutting relation with the casing 10. A flexible tube 59 of conducting material is secured at one end thereof within the central aperture as by soldering or other means. The opposite end of the flexible conducting tube 59 carries a nose piece or shield 60 of conducting material. Located centrally within the tube 59 is a flexible conducting member 61, one end of which is connected to the magnetic plunger 18 and the opposite end is connected to a conducting sleeve 62 which serves as a holder for carbon rod 17. The member 61 is maintained centrally of the tube 59 and insulated therefrom by insulating beads 63 which may be spaced as shown in the drawing or disposed along the entire length of the member 61. Upon sliding the pin 39 in slot 41 the member 61 and carbon rod 17 is moved forward to contact the material and operates in the same manner as the devices shown in Fig. 1 and Fig. 2.

The device may be used to join insulated wires, such as the enameled wire 64, to non-insulated wires by means of the arrangement shown in Fig. 6 wherein a flexible lead 65 is attached at one end by means of a terminal lug 66 to the bolt or other means securing the nose or shield 12 in place. The opposite end of lead 65 is attached to a clamping member, such as an alligator clip 67. In operation the clip 67 is fastened to an exposed portion of the non-insulated wire 68 which may be a lead on a resistor 71 or other component, as shown, to insure contact therewith since with an insulated wire such as 64 wrapped about the non-insulated lead 68 the nose or shield 12 could not make contact with the non-insulated lead 68 thereby preventing completion of a circuit. By the arrangement shown in Fig. 6 however, a circuit from the carbon rod 17, when it is advanced to contact the material to be welded, is completed through lead 65. When the carbon rod 17 is advanced to contact the wires to be welded, if the carbon rod contacts the bare end of the insulated conductor, a circuit will be completed just as well as by contacting the non-insulated lead 68. In the welding process which is carried on in the same manner as in the devices in Fig. 1 and Fig. 2, the insulation is burned off the lead 64.

Figs. 7 and 8 represent two possible forms of partially open nose or shield structures which may be used where such structure is more convenient to make a particular joint in place of the closed forms shown in Figs. 1, 2, 4 and 6.

The device shown in Figs. 1 and 2 could be adapted to permit welding joints on a mass production basis such as on an assembly line by providing a fixed support for the device and a linkage connection of the pin 39 with a foot lever so that the operator's hands would be free to hold the material to be welded and the welding operation initiated by operating the foot lever to bring the carbon rod in contact with the work to initiate the welding cycle.

In addition it is within the scope of this invention to maintain the movable electrode in a fixed position, for example, as by holding the pin 39 in a notch in the casing 10 so that a circuit is completed across the nose or shield 12 and the carbon electrode 17 by merely moving the material to be welded in contact with the nose and the electrode.

The welding operation could also be controlled by interrupting and varying the source voltage while maintaining the electrode, shield and material in a fixed position. It is further contemplated that varying the source will vary the amplitude of the vibrating electrode to compensate for electrode erosion.

Figure 9:
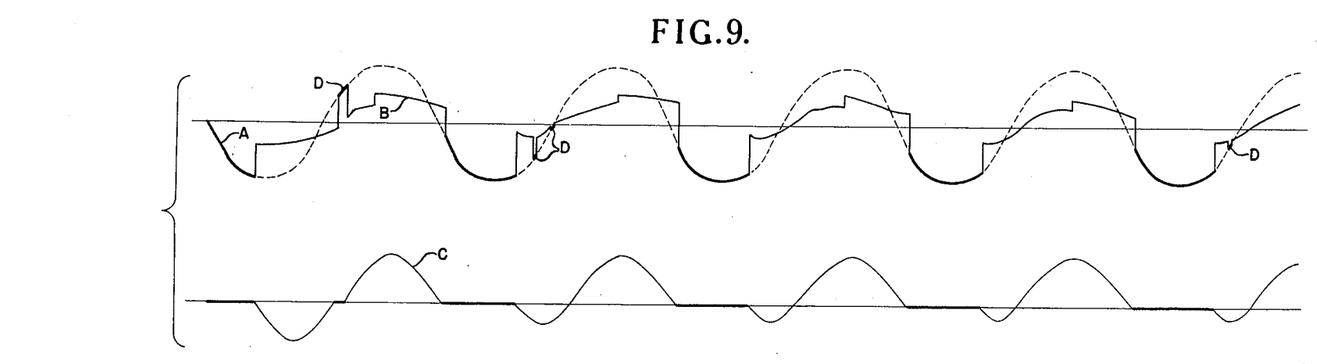
Fig. 9 is a trace of an oscillogram showing the relation among certain electrical phenomena existing during the initial portion of a welding operation involving copper to iron.
Figure 10:
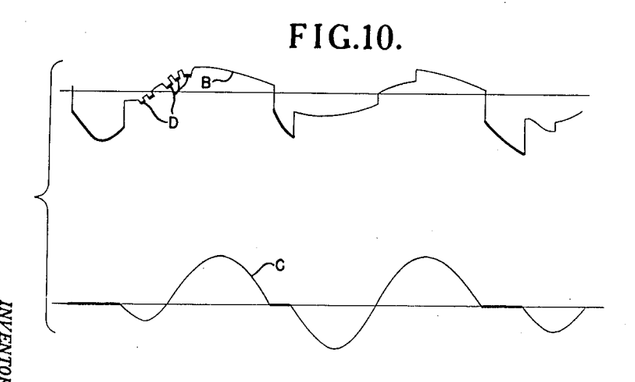
Fig. 10 is a trace of an oscillogram similar to Fig. 9 for the final portion of a welding operation involving copper to iron.

Fig. 9, curves A, B and C are traces of oscillograms showing the relation among the 60 cycle alternating line voltage A, transformer secondary voltage B and arc current C during a few cycles when a copper-iron junction was being welded. The portions D of curve B represent instances, which are relatively few, when no arc current flows and the welding operation is momentarily interrupted as shown on curve C. For this particular portion of the welding operation, arc current flowed for about 75.5% of the total possible time during each cycle and this is probably a period during which copper in the junction was being melted which did not require arc current to flow for as long a period during each cycle as when iron in the junction was being melted, as will be apparent from the curves of Fig. 10, which are also for a copper-iron junction wherein arc current flowed for 81% of the total possible time during each cycle, since it takes a longer period of time for the heat to be applied to the iron to melt it than for the copper. During the welding process the arc completes a circuit through whichever material offers the path of least resistance and the arc may jump from one material to another during the welding process. In Fig. 10, B represents transformer secondary voltage and C the arc current. Fig. 10 shows the conditions which existed about the 17th cycle during the welding of a copper-iron junction.

It is evident from the curves of Figs. 9 and 10 that, due to the phase shift as mentioned previously herein, arc current flows for a period of time after the line voltage has reached zero magnitude, which permits improved stability of the arc. It is further evident that arc current flows for a longer time during each cycle for the period represented by Fig. 10 than for the period represented by Fig. 9 since during this latter period the iron portion of the junction was probably in contact with the arc for a greater number of cycles than in Fig. 9 where copper probably was in contact for a greater number of cycles.

Arc current will flow for a longer time during each cycle as in Fig. 10 as compared with Fig. 9 for the further reason that after the weld has progressed for a number of cycles, the mass of molten conducting material has increased in size and is in a state where the flow of ions in the arc from the weld to the electrode is increased which assists in stabilizing the arc. While the above examples are for copper-iron junctions, it is to be understood that other metals and combinations of metals, may be welded with the device.

Figure 11:
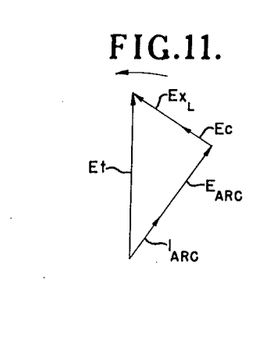
Fig. 11 is a vector diagram showing the phase relation of certain electrical phenomena during a welding operation.

Fig. 11 shows the phase relation existing among the arc current, I arc, and voltage, E arc, the voltage drop due to the transformer inductive reactance, $Ex_L$, the solenoid voltage drop $E_c$, and the transformer secondary voltage, $E_t$. As shown, the arc current and voltage are in phase, the voltage drop due to the transformer inductive reactance and the voltage across the solenoid are in phase and the arc current and voltage lag the transformer secondary voltage, $E_t$, by at least 40°. This latter feature of the device contributes to the stability of the arc.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

Having thus fully described the invention, what is claimed as new and desired to be secured by Letters Patent is:

1. A welding device energizable by an alternating current source comprising an elongated tubular casing, an elongated electroconducting shield having a central bore and detachably engaging one end of said casing and adapted to engage the work to be welded for electrical conduction therethrough, the opposite end of said bore being open, said shield and said casing being axially aligned, an elongated electrode having its longitudinal axis coincident with the longitudinal axis of said casing and shield, solenoid means to reciprocate said electrode along its longitudinal axis, manual means to remove said solenoid with respect to said shield, said electrode and said shield being in spaced relation, said solenoid being energized contemporaneously with flow of arc current therethrough to reciprocate said electrode by a mass of conducting material connecting said electrode and said shield upon movement of said electrode into registry with the open end of said bore and into contact with the work.

2. A welding device as in claim 1 wherein said shield comprises a first end section in detachable engagement and coaxial with one end of said tubular casing, and an opposite conical end section of smaller diameter than said first end section wherein said conical section has a portion removed to expose said electrode.

3. A welding device energizable by alternating current comprising, an elongated insulating casing having a first open end and a second open end opposite said first open end, an insulating closure member having a central aperture for insertion in said first open end of said casing, an insulating elongated guide member mounted for longitudinal movement in said closure aperture, a solenoid having first and second end caps mounted for longitudinal movement within said casing and coaxial therewith, a plunger of magnetic material mounted for longitudinal movement coaxially with said solenoid, a conducting sleeve surrounding said plunger and attached to said end caps, said plunger having an abutment at one end thereof and a recessed portion adjacent thereto, adjusting means at the opposite end of said plunger extending beyond said apertured closure member threadably connected to said insulating guide member and detachably secured to said plunger, an elongated conducting shield having a central bore detachably engaging said second open end of said casing, said last named shield being in axial alignment with said casing, an insulated guide member fixedly mounted internally of said conducting shield, an elongated electrode inserted in said recessed portion of said plunger and supported by said guide for reciprocating motion, a first resilient means surrounding said plunger and arranged to bias said plunger against the magnetic force of said solenoid, and a second resilient means surrounding said first resilient means arranged to restrain the free forward motion of said solenoid.

4. A welding device as in claim 3 wherein said casing is provided with a slot adjacent said second end cap, a pin fixedly attached to said second end cap and arranged for sliding movement in said slot whereby said solenoid and said electrode are urged forwardly against the restraining action of said second resilient means.

5. A welding device as in claim 4 including in combination a transformer in said casing having a high leakage reactance whereby a phase lag of arc current with respect to transformer secondary voltage is provided.

6. A welding device as in claim 4 including a flanged insulating member, a conducting washer on said member, one face of said flanged insulating member being in contact with said second end cap, said conducting washer being in contact with the opposite face of said flanged insulating member and additionally providing a seat for one end of said second resilient means.

7. A welding device energizable by alternating current comprising, an elongated insulating casing having a first open end and a second open end opposite said first open end, an insulating closure member having a central aperture for insertion in said first open end of said casing, a solenoid having first and second end caps mounted for sliding movement within said casing and coaxial therewith, a plunger of magnetic material mounted for reciprocal movement coaxially with said solenoid, a conducting sleeve surrounding said plunger and attached to said end caps, said plunger having an abutment at one end thereof and a recessed portion adjacent thereto, an extension detachably secured to said plunger at the end opposite said recess, a flanged portion on said extension in contact with said first end cap, an elongated conducting shield member having a central bore detachably engaging said second open end of said casing, said last named shield being in axial alignment with said casing, an insulating guide member fixedly mounted internally of said conducting shield, an elongated electrode inserted in said recessed portion of said plunger and supported by said guide for reciprocating motion, a first resilient means surrounding said plunger and arranged to bias said plunger against the magnetic force of said solenoid, and a second resilient means surrounding said first resilient means restraining the free forward motion of said solenoid.

8. A welding device as in claim 7 wherein said casing is provided with a slot adjacent said second end cap, a pin fixedly attached to said second end cap and arranged for sliding movement in said slot whereby said solenoid and said electrode are urged forwardly against the restraining action of said second resilient means.

9. A welding device energizable by an alternating current comprising an elongated insulating casing open at each end, a substantially conical conducting shield having a central bore detachably secured to one open end of said casing and coaxial therewith, an insulating guide member fixedly mounted internally of said shield, a reciprocating plunger of magnetic material, solenoid means to reciprocate said plunger, a first resilient means surrounding said plunger to bias said plunger against the magnetic force of said solenoid, a second resilient means surrounding said first resilient means to bias the free forward motion of said solenoid, stop means on said magnetic plunger to limit the forward motion of said plunger, lever means to urge said solenoid and said plunger forward against the action of said second resilient means, means to support said casing, and transformer means within said support means to energize said device.

10. A welding device as in claim 9 wherein said lever means is pivoted to said support means and provided at one end thereof with a pin and slot arrangement adapted to be secured to said solenoid whereby pressure applied to said lever means urges said solenoid and said plunger forward against the restraining action of said second resilient means.

11. A welding device energizable by alternating current comprising, an elongated insulating casing having a first open end and a second open end opposite said first open end, an insulating closure having a central aperture for insertion in said first open end of said casing, solenoid means mounted for longitudinal movement within said casing and coaxial therewith, a plunger of magnetic material mounted for longitudinal movement coaxially with said solenoid, said plunger having a recessed portion at one end thereof, a conducting closure member having a central bore positioned within said second open end of said casing, said last named closure being in axial alignment with said casing, a flexible conducting tubular member fixedly attached at one end within the central aperture of said conducting closure member, a substantially conical conducting shield fixedly secured to the opposite end of said flexible conducting tubular member, a flexible conducting cable secured at one end within the recessed portion of said plunger and secured to a tubular conducting member at the opposite end thereof, an electrode inserted within said tubular conducting member, said flexible conducting cable being coaxial with said flexible tubular conducting member and in spaced relation thereto, insulating beads arranged concentrically with said flexible conducting cable to insulate said cable from the surrounding flexible tubular conducting member and said shield, a first resilient means surrounding said plunger to bias said plunger against the magnetic force of said solenoid, a second resilient means surrounding said first resilient means and adapted to restrain the free forward motion of said solenoid, and means urging said solenoid, flexible cable and electrode forwardly against the restraining force of said second resilient means.

12. A welding device as in claim 11 wherein said casing includes a slot adjacent one end of said solenoid and a pin fixedly secured to the same end of said solenoid and arranged for sliding motion within said slot whereby said solenoid, flexible cable and electrode are urged forward against the restraining action of said second resilient means.

13. In a magnetically operated welding device energizable by an alternating current source, a high leakage reactance transformer having a primary and secondary winding, a solenoid, a reciprocative magnetic plunger coaxial with said solenoid, solenoid resilient restraining means, means including a conducting washer for seating one end of said restraining means, an electrode affixed to one end of said plunger and coaxial therewith, a conducting shield surrounding said electrode and coaxial therewith, means providing relative movement between the solenoid and said shield, an insulating guide fixedly secured within said shield whereby said electrode is maintained in spaced relation to said shield, a resilient contact member in continuous engagement with said plunger, one terminal of said transformer secondary winding being connected to one terminal of said solenoid, the other terminal of said solenoid being connected by means of said resilient contact to the reciprocative magnetic plunger, the other terminal of said secondary winding being connected to said resilient restraining means through said conducting washer, said resilient restraining means being connected to said conducting shield, whereby when a mass of conducting material completes a circuit across said electrode and said shield, a current will flow through said shield, said resilient restraining means, said conducting washer, said transformer secondary winding, said solenoid to said plunger and electrode through said resilient contact and thence to said shield through the arc thus formed thereby providing reciprocating motion for said electrode at source frequency.

14. A welding device energizable by alternating current including a magnetically reciprocative plunger having an electrode fastened thereto, a solenoid adapted for linear movement and carrying said electrode, a transformer, electroconductive means shielding said electrode and arranged in spaced relation thereto for engagement with the work to be welded to provide conduction therethrough to said electrode, means providing for controlled movement of the solenoid, resilient biasing means for said plunger, a mass of conducting material effective to establish an arc between said shielding means and said electrode, the transformer secondary being in series connection with said solenoid and said arc through said shielding and biasing means and said plunger, thereby providing reciprocating motion for said magnetic plunger and attached electrode upon striking of said arc and maintained thereby with flow of arc current.

15. A method of welding which comprises the steps of urging a first reciprocable electrode forward to a position in arc striking adjacency with electrical conductive material to be welded which is in contact with a second electrode of a welding circuit thereby completing a circuit through said reciprocable electrode and the second electrode by simultaneous contact of both electrodes with the mass of conductive material, initiating the welding operation by controlled reciprocation of said first named electrode, thereafter continuously reciprocating said electrode within predetermined limits of travel in correlation with the magnitude of arc current flow therethrough, and terminating said welding operation by diminution of said mass of conducting material beyond the limits of reignition travel of the movable electrode thereby opening the circuit across the electrodes.

16. In an arc welding device for joining electrical wiring junction elements by mutual fusion, in combination, a casing having an apertured electrically conductive nose portion, an electrically conductive arc drawing electrode longitudinally movable within said casing, said electrode being insulated from said nose portion and adapted for movement through the aperture thereof, a solenoid unit disposed within said casing and linearly movable with respect thereto, means yieldably urging said solenoid away from said nose portion, a carrier for said electrode adapted for controlled movement by the solenoid and with respect thereto and to said nose portion, means yieldably biasing said carrier and electrode to a wire engaging position adjacent said nose with movement of the solenoid, and means on said casing and engaging the solenoid for controlled movement thereof whereby the electrode moved therewith engages the wire junction elements for arc initiation current flow.

17. The device of claim 16 in combination with manual grip means on said casing, and lever actuating means cooperative with said last named means for solenoid movement which comprises, manipulative means rendered operative when said device is hand held by said grip and for moving the solenoid from a normally retracted position to an arc striking position, thereafter to maintain said solenoid in a manner whereby the electrode position after striking of the arc becomes a function of the arc current flowing in the solenoid from the casing nose portion conductor through a portion of the wire junction to the movable electrode, said solenoid being series connected through said electrode and adapted for connection across the secondary terminals of a low impedance high leakage reactance transformer for a phase lag of arc current with respect to transformer secondary voltage to maintain said arc constant with solenoid positioning by said manipulative means until the completion of fusion of the junction metals.

18. In an arc welding device for joining junction elements by mutual fusion, in combination, a work engaging electro-conductive shell electrode, an electrically conducting arc drawing electrode coaxially arranged for longitudinal movement within said shell electrode, a linearly movable solenoid means adapted to reciprocate said movable electrode in response to flow of arc current therethrough, biasing means normally urging the solenoid in a direction away from the said junction to be welded, means normally biasing the movable electrode toward the junction, and means for advancing the solenoid and electrode into an arc striking relationship with said junction for welding thereof.

19. A method of welding electrical circuit wiring junctions which comprises the steps of positioning a first electrode of a welding circuit in electrical contact with the wiring junction to be welded, positioning a second welding electrode in contact with said junction, striking an arc between said second electrode and the junction, thereafter continuously maintaining said second electrode within predetermined limits of travel and in correlation with the flow of arc current therethrough, and extinguishing the arc by fusion erosion of said junction out of arc maintaining relationship with said vibrating electrode.

20. A method of arc welding electrical circuit connections from an A. C. power source which comprises the steps of positioning a first electrode of a welding circuit in electrical contact with a portion of the connection, advancing a second movable welding electrode into contact with the connection, initiating an arc therebetween, providing controlled reinitiation of the arc with cyclic extinguishing changes in the power source, establishing a predetermined arc gap within predetermined limits of electrode movement with each re-establishment of the arc and controlled in correlation with the flow magnitude of arc current, and finally extinguishing the arc at the completion of the weld correlative with fusion erosion of the connection beyond the predetermined limits of movement of the movable electrode.

References Cited in the file of this patent

UNITED STATES PATENTS

| Number | Name | Date |
|---|---|---|
| 2,383,382 | Harding | Aug. 21, 1945 |
| 2,445,863 | Sarazin | July 27, 1948 |
| 2,468,808 | Drake | May 3, 1949 |
| 2,473,871 | Edels | June 21, 1949 |
| 2,491,479 | Dash | Dec. 20, 1949 |
| 2,510,415 | Pitcher | June 6, 1950 |
| 2,510,620 | Craven | June 6, 1950 |
| 2,572,084 | Wilson | Oct. 23, 1951 |